United States Patent [19]
Clark

[11] Patent Number: 5,367,817
[45] Date of Patent: Nov. 29, 1994

[54] FISHING LURE COMBINATION

[76] Inventor: Thomas C. Clark, Rte. One, Box 137, Hampton, Fla. 32044

[21] Appl. No.: 112,353

[22] Filed: Aug. 27, 1993

[51] Int. Cl.⁵ ............................................. A01K 85/00
[52] U.S. Cl. ................................ 43/42.36; 43/42.02; 43/42.24; 43/42.38; 43/42.39
[58] Field of Search ................ 43/42.02, 42.04, 42.08, 43/42.05, 42.1, 42.24, 42.36, 42.37, 42.38, 42.39, 42.41, 42.49

[56] References Cited

U.S. PATENT DOCUMENTS

| | | | |
|---|---|---|---|
| 859,227 | 7/1907 | Jackson | 43/42.04 |
| 1,394,313 | 10/1921 | Leeper | 43/42.39 |
| 1,582,171 | 4/1926 | Foss | 43/42.37 |
| 2,290,433 | 7/1942 | Jeffers | 43/42.02 |
| 2,449,700 | 9/1948 | Hubbard | 43/42.39 |
| 2,869,278 | 1/1959 | Cook | 43/42.08 |
| 3,017,716 | 1/1962 | Hawks | 43/42.24 |
| 3,147,564 | 9/1964 | Messler | 43/42.24 |
| 4,367,607 | 1/1983 | Hedman | 43/42.1 |
| 5,175,955 | 1/1993 | Wilson | 43/42.36 |

*Primary Examiner*—P. Austin Bradley
*Assistant Examiner*—James Miner
*Attorney, Agent, or Firm*—Arthur G. Yeager

[57] ABSTRACT

The combination of a fishing hook, a weight, and an artificial bait which in use appears to have a moving mouth. The weight has a tapering head with a wire loop eye for attachment to the hook. The flexible artificial bait with an openable mouth is operable by tugging on the fishing line that passes through the head of the bait and is connected to the hook. The hook preferably has its eye and its point embedded in the bait.

20 Claims, 2 Drawing Sheets

FISHING LURE COMBINATION

DISCLOSURE DOCUMENT

This invention is described in Disclosure Document No. 333,218 filed in the U.S. Patent and Trademark Office on Feb. 1, 1993.

BACKGROUND OF THE INVENTION

Many modern fishing lures are on the market today that are combinations of a fishing hook, an artificial bait, and a weight or sinker. Nearly all of such lures are attempts to simulate living fish or other water creatures which are fed upon by larger fish. In recent times the artificial bait frequently is a molded gelatinous material which is naturally flexible and moves in the water in ways that are attractive to feeding fish. Fishing hooks are frequently attached to the artificial bait by embedding them in the bait to hide them from the feeding fish. With the artificial bait and the embedded hook attached to the end of a fishing line, there remains the need to add whatever weight the fisherman believes is needed to maintain the lure at the proper depth under the water.

It is an object of the invention to provide an improvement in the fishing lure combination. It is another object of this invention to provide an improved fishing lure wherein the bait has a movable jaw action to simulate feeding. It is another object of the invention to provide a weight which can be threaded onto the fishing hook to produce a nested combination. Still other objects will become apparent from the more detailed description which follows.

BRIEF SUMMARY OF THE INVENTION

This invention relates to a fishing lure which is a combination of a fishing hook, a weight, and an artificial flexible bait body. The weight has a pyramidal body with a forward end apex, a rearward end wall, and a longitudinal axis passing through said apex and said wall with a wire loop eye at the apex surrounding the axis, and a slotted passageway along the axis adapted to guide the hook therethrough. The bait body is an elongated member having a forward head end and a rearward tail end, the head end has a bifurcated mouth portion to resemble upper and lower jaws that can be opened or closed with respect to each other. There also is a first passageway through the forward portion of the upper jaw to the mouth, and a second passageway from the rearward portion of the mouth to the outside of the body adjacent the lower jaw portion.

In a preferred embodiment the loop eye is spaced outwardly from the apex end and is positioned in a plane parallel to the apex end. In another preferred embodiment the weight has a longitudinal groove aligned with the loop eye and with the slotted passageway so as to nest with the hook in a snug manner. In still another embodiment the artificial bait is an elongated molded gelatinous member with the mouth terminating in two oppositely directed branches to facilitate the hinged action of the jaw movements of the bait. To operate the jaw movements the fishing line passes through a passageway through the upper jaw member and is connected to the eye of the fishing hook adjacent the rear portion of the mouth cut. This allows the flexible fish line to cause the upper jaw portion to move away from the lower jaw portion when there is tension applied to the line, resembling the opening of the mouth of the bait.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The attached drawings provide an excellent understanding of this invention when used in connection with the following description.

Figure 10:
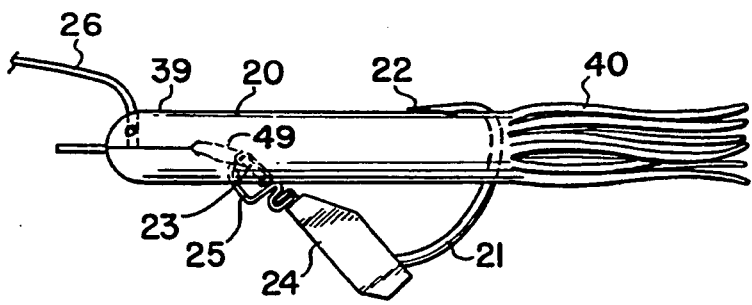
FIG. 10 is a side elevational view of the fishing lure combination of this invention.

The entire fishing lure of this invention includes an artificial bait 20, a fishing hook 21, and a weight 24, as shown especially in FIG. 10. The fishing hook 21 is, of course, joined to a fishing line, but, strictly speaking, the line 26 is not a part of the lure of this invention.

The artificial bait which is illustrated here in FIGS. 6–11 is a molded gelatinous material intended to resemble a fish, a worm, or any other aquatic creature which larger fish feed upon. It is, of course, entirely suitable for the lure to be made of wood, metal, plastic, or any other material. Shown in FIGS. 6–11 is a cylindrical shape having a head end 39 with eyes 41 and a tail end 40 with a plurality of strips which move individually in the water currents much like a grass skirt of a hula dancer. The bait may be molded to more accurately resemble a fish, a frog, a worm, or any other creature found in the water. The shape of tile bait in FIGS. 6–11 is merely an illustration of a simple form having eyes 41, a head 39, a body 20 and a tail 40. The key feature of the bait 20 insofar as this invention is concerned is a mouth formed by molding the body to include a planar split lengthwise of the body and extending a short distance from the head end into the body. A mouth cut can be made by slicing or slitting the head end after it is molded but it is preferable to mold it in place. The mouth can be moved to open (as in FIG. 8) or close as in FIG. 7. Mouth 42 is a bifurcated head of bait 20 dividing head end 39 into an upper jaw portion 44 and a lower jaw portion 45. In order to facilitate the opening of the mouth 42 it is preferable to include at the depth of the mouth 42 two angle branches 43 molded or cut at an angle outwardly away from mouth line 42. Branches are very short in length, but they permit jaws 44 and 45 to open in a more realistic manner than is the case when branches 43 are not employed.

In order to control the opening and closing of the mouth in a realistic way there is a hole or passageway 46 through upper jaw portion 44 through which fishing line 26 is threaded upwardly of its connection to fish hook eye 23. This arrangement permits the fisherman to apply and release tension on line 26 to cause the bait's mouth to open or close, respectively. By jiggling the line 26 the bait 20 can be made to appear to be opening and closing its mouth as it would do when breathing or eating. In this way the artificial bait is made to appear almost real. Another added feature is to include a simulated tongue 50, which is merely a small narrow strip of material glued to lower jaw portion 45. This strip may appear to be a tongue or a portion of food being taken by the bait 20.

In order to facilitate the fastening of fishing hook 21 to bait 20, there is a second hole or passageway 49 extending from the depth of mouth 42 to opening 48 on the outside of the body of bait 20 on its lower side adjacent to lower jaw portion 45. In most gelatinous artificial baits of the prior art there is no such passageway and the hook is merely pushed through the body to wherever the fisherman wants to place the hook. This procedure tears the gelatinous body and usually weakens it such that the bait will quickly tear and become useless. In this invention hole 49 is molded into the shape which materially reduces the tendency to tear. The fisherman carefully threads the hook 21, pointed end 22 first, through hole 46, by passageway 47 into mouth 42, then into passageway 49 and out hole 48, and then passes the hook point 22 into the body of the bait 20 wherever it is convenient, embedding the end 22 in the body so as to conceal it, as shown, for example, in FIG. 10. This leaves the eye 23 of hook 21 approximately at the forward end of hole 49 at the depth of mouth 42. There has been introduced into the fishing lure art in U.S. Pat. No. 4,905,402 to Clark a spring clip for attaching a gelatinous lure to a fishing hook. Such a spring clip is shown as 25 in FIGS. 10 and 11, and is a preferred embodiment in this invention to prevent the lure from moving up and down line 26. Clip 25 may be attached to line 26 before threading the hook through bait 20. After the positioning of hook 21 in the bait 20 the spring clip can be opened, attached to a nearby portion of bait 20 and also to weight 24 adjacent to loop eye 32, and then closed so as to prevent bait 20 and weight 24 from sliding along the length of hook 21.

Weight 24 is an important component of this invention, and its design permits it to nest with the shank of fishing hook 21 and lie close to the underside of lure 20 and to appear to be a fin to another fish. Weight 24 is shown in an enlarged illustration in FIGS. 1–5 showing five different views of the weight, which preferably would be made of stainless steel or other heavy metal, such as brass, and has an eye for attachment to the fishing hook or line.

Figure 2:
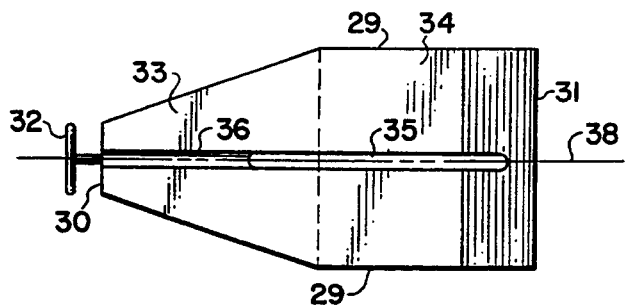
FIG. 2 is a top plan view of the fishing lure weight of this invention.
Figure 4:
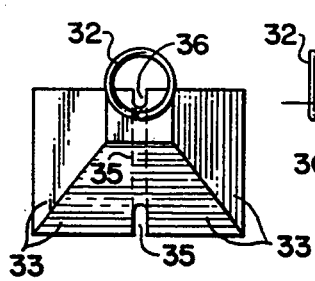
FIG. 4 is a front elevational view of the fishing lure weight of this invention.
Figure 1:
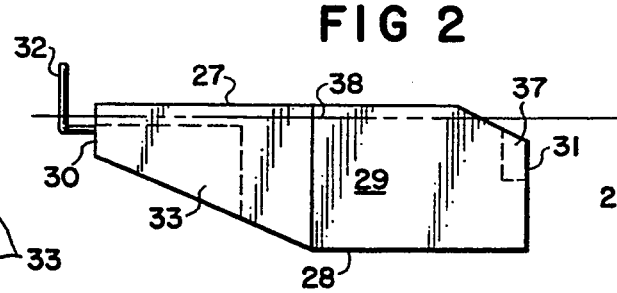
FIG. 1 is a side elevational view of the fishing lure weight of this invention.
Figure 5:
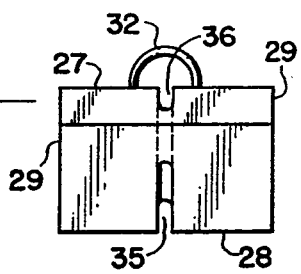
FIG. 5 is a rear elevational view of the fishing lure weight of this invention.
Figure 3:
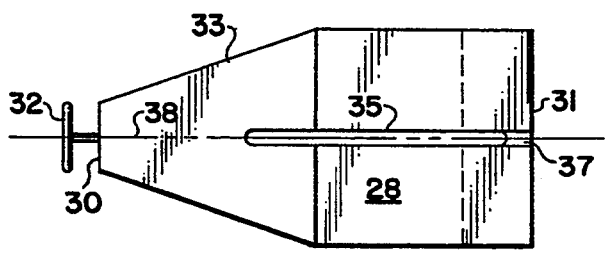
FIG. 3 is a bottom plan view of the fishing lure weight of this invention.
Figure 6:
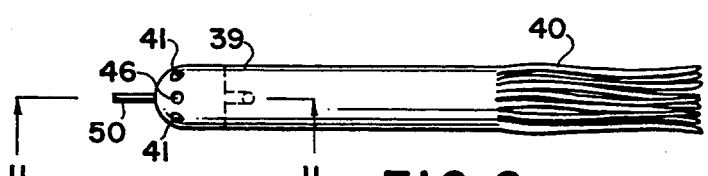
FIG. 6 is a top plan view of the artificial bait of this invention
Figure 7:
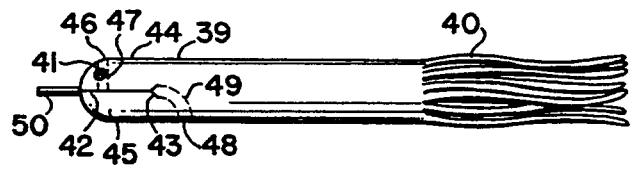
FIG. 7 is a side elevational view of the artificial bait of this invention with the mouth of the bait closed.
Figure 8:
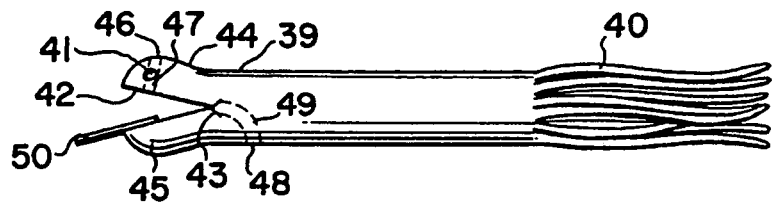
FIG. 8 is a side elevational view of the artificial bait of this invention with the mouth of the bait open.
Figure 9:
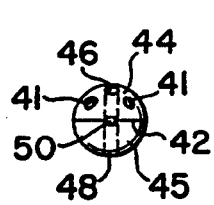
FIG. 9 is a front elevational view of the artificial bait of this invention.

Weight 24 is shown as an irregular prismatic shape with a tapered, pyramidal forward portion 33 and a non-tapered regular rearward portion 34. These two portions 33 and 34 are joined in the mid-section of the weight 24 between an apex end 30 and a rear wall 31, said end 30 and wall 31 being generally parallel to each other and perpendicular to a lengthwise axis 38. Rear wall 31 includes a solid small portion 37 which is part of the rear wall 31 on the outward side and is part of the slotted passageway 35 on the inward side. Spaced outwardly from apex end 30 is a loop eye 32 positioned to lie in a plane spaced outwardly from, and parallel to, apex end 30, and encircling axis 38. Along axis 38 is a slotted passageway 35 extending through weight 24 from its top surface 27 to its bottom surface 28 and to the lower portion of rear wall 31. Slotted passageway 35 is a space centered on axis 38 when viewed from the top as shown in FIG. 2 from the bottom in FIG. 3, from the front as shown in FIG. 4, or from the rear as shown in FIG. 5. This passageway 35 is of a size sufficient to permit the point and shank of hook 21 to pass through, and therefore is about 0.02–0.15 inch for most amateur fishing lures, and may be larger for deep sea fishing or sport fishing uses. Groove 36 joins apex end 30 to the forward reaches of passageway 35, and likewise is of a size to receive the shank of fishing hook 21. In use a fish hook 21 is threaded through loop eye 32, along groove 36 and through slotted passageway 35 and thence into the body of artificial lure 20 with the hook point 22 generally embedded in lure 20 to function as a weedless bait, or with hook point 22 not embedded, if a weedless bait is not desired.

Figure 11:
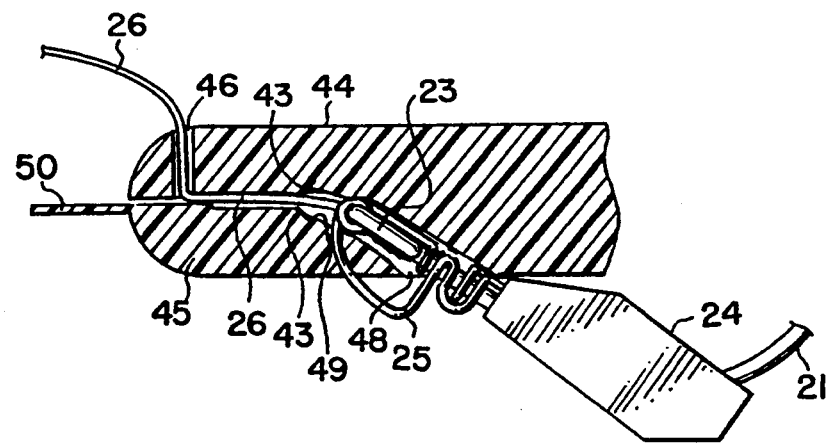
FIG. 11 is an enlarged cross-sectional view taken at 11—11 of FIG. 6 with the addition of the hook, weight and line not shown in FIG. 6.

The combination of lure 20, fishhook 21, and weight 22 is shown in FIGS. 10 and 11. Fish line 26 is also shown there to be threaded into hole 46, through mouth cut 42, and through hole 49 to be tied to hook eye 23 which generally will be lodged in hole 49. By jiggling line 26 the mouth cut 42 will open and close to simulate an aquatic creature breathing and/or feeding.

While the invention has been described with respect to certain specific embodiments, it will be appreciated that many modifications and changes may be made by those skilled in the art without departing from the spirit of the invention. It is intended, thereofre, by the appended claims to cover all such modifications and changes as fall within the true spirit and scope of the invention.

What is claimed as new and what it is desired to secure by Letters Patent of the United States is:

1. A fishing lure comprising the combination of a fishing hook, a weight, and an artificial flexible bait body; said weight having a pyramidal body with a forward end apex, a rearward end wall, and a longitudinal axis passing through said apex and said wall with a wire loop eye at said apex surrounding said axis, and a slotted passageway along said axis adapted to guide said hook therethrough; said bait body being an elongated member having a forward head end and a rearward tail end, said head end being bifurcated to provide the illusion of a mouth with upper and lower jaw portions, a first passageway through the forward portion of said upper jaw to said mouth and a second passageway from the rearward portion of said mouth to outside of said body adjacent said lower jaw portion, said first passageway being adapted to receive a fishing line therethrough to cause movement of said upper jaw portion when tension is applied to said fishing line from above the lure.

2. The lure of claim 1 wherein said bait body is made of a flexible elastomeric gelatinous material.

3. The lure of claim 1 wherein said first passageway is adapted to receive a fishing line and fishing hook threaded therethrough.

4. The lure of claim 1 wherein said second passageway is adapted to receive said fishing hook threaded therethrough.

5. The lure of claim 1 wherein said mouth is substantially planar and includes at its deepest extent at least one short branch extension at an angle to said planar mouth.

6. The lure of claim 5 wherein said mouth includes two short branch extensions at equal and opposite angles to said planar mouth, each said extension adapted to facilitate a hinged action for said upper and lower jaw portions.

7. The lure of claim 1 wherein said fishing hook includes a coiled spring wire clip member around the shank of said fishing hook adjacent the eye thereof.

8. The lure of claim 1 wherein said weight has an irregular prismatic shape of six sides pyramidally tapered at said forward end to said apex with said slotted passageway extending completely through said weight from one side to the opposite side.

9. The lure of claim 1 wherein said wire loop eye lies in a plane that is spaced apart from, and parallel to, said forward end apex.

10. In a fishing lure comprising a fishing hook, a weight, and an artificial bait, the improvement wherein said artificial bait is a flexible molded gelatinous member having an elongated body with a bifurcated head at one end thereof and a tail at the other end thereof, said bifurcated head comprising a planar split extending a short distance lengthwise of said body to form the illusion of a mouth which is openable between an upper jaw member and a lower jaw member, a first passageway through said upper jaw member adapted to receive a fishing line and fishing hook therethrough and a second passageway from the depth of said mouth to the outside of said body adjacent said lower jaw member and adapted to receive a portion of said fishing hook therethrough.

11. The fishing lure of claim 10 wherein said split at its greatest depth additionally includes two oppositely diverting short branch splits adapted to facilitate the opening of said mouth.

12. In a fishing lure comprising a fishing hook, a weight, and an artificial bait, the improvement wherein said weight is an irregular elongated prismatic solid having a four-sided pyramidally tapering portion terminating in an apex, said prismatic solid having upper and lower walls and a pair of side walls, a wire loop eye projecting outwardly from said apex and having an opening therethrough, said loop eye lying in a plane generally perpendicular to the longitudinal direction of said prismatic solid, said loop eye adapted and arranged to surround a shank of a fishing hook passing therethrough, a slotted passageway generally parallel to said longitudinal direction and extending through said upper and lower walls of said prismatic solid, said passageway accommodating passage of a fishing hook with its shank being adapted to be adjacent said lower wall and its hook end being adapted to pass therethrough and spaced above said upper wall.

13. The fishing lure of claim 12 wherein said weight includes a longitudinal groove extending from said apex adjacent said loop eye along said lower wall and intersecting said slotted passageway, said groove and said passageway being in substantial alignment with each other and with opening in said loop eye.

14. The lure of claim 12 wherein said passageway is partially defined by an end wall opposite to said apex with a fishing hook being adapted to pass therethrough forwardly of said end wall.

15. A fishing lure comprising a fishing hook and an artificial bait, the improvement wherein said artificial bait includes an elongated body having opposite end portions, a bifurcated head attached at one of said end portions, a tail attached at another of said end portions, said bifurcated head including a planar split extending a short distance lengthwise of said body to form an illusion of a mouth with an openable upper jaw member and a lower jaw member, a first passageway through said upper jaw member adapted to receive a fishing line and said fishing hook threadedly therethrough and a second passageway from a depth of said mouth outwardly of said body adjacent said lower jaw member and adapted to engage an eye portion of said fishing hook threaded therethrough.

16. The fishing lure of claim 15 wherein said planar split at its greatest depth additionally includes a pair of oppositely diverting short branch splits inclined with respect to said planar split and adapted to facilitate opening of said mouth.

17. The lure of claim 15 wherein said bait body is made of a flexible elastomeric gelatinous material.

18. The lure of claim 15 further comprising a coiled spring wire clip member around a shank of said fishing hook adjacent said eye thereof for attachment to said bait and inhibiting movement of said eye back through said second passageway.

19. The lure of claim 18 further comprising a weight having an enlarged eye threaded on said shank and disposed adjacent said eye of said hook, said spring clip member attaching said weight to said hook.

20. The lure of claim 19 wherein said weight includes a slotted passageway extending along said shank and completely through said weight from one side to the opposite side whereby said shank adjacent said eye is disposed on said one side of said weight and passes through said weight to dispose its hook end portion on said another side of said weight.

* * * * *